US008276121B2

(12) United States Patent
Miller et al.

(10) Patent No.: US 8,276,121 B2
(45) Date of Patent: Sep. 25, 2012

(54) SELECTION OF VERSIONED RESOURCE AMONG MULTIPLE COMPATIBLE VERSIONS

(75) Inventors: James Miller, Bellevue, WA (US); Vincent Henderson, Snohomish, WA (US); Thorsten Brunklaus, Bellevue, WA (US); Richard Lander, Bellevue, WA (US); Thottam R. Sriram, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1189 days.

(21) Appl. No.: 11/820,436

(22) Filed: Jun. 19, 2007

(65) Prior Publication Data

US 2008/0320460 A1 Dec. 25, 2008

(51) Int. Cl.
*G06F 9/44* (2006.01)
*G06F 9/45* (2006.01)
(52) U.S. Cl. .................. 717/122; 717/120; 717/121
(58) Field of Classification Search .......... 717/120–124; 707/695–696
See application file for complete search history.

(56) References Cited

U.S. PATENT DOCUMENTS

| | | | | |
|---|---|---|---|---|
| 4,558,413 A * | 12/1985 | Schmidt et al. | ............... | 717/170 |
| 5,701,472 A | 12/1997 | Koerber et al. | | |
| 6,185,734 B1 | 2/2001 | Saboff et al. | | |
| 6,519,767 B1 | 2/2003 | Carter et al. | | |
| 6,681,382 B1 * | 1/2004 | Kakumani et al. | ............ | 717/122 |
| 6,725,453 B1 | 4/2004 | Lucas et al. | | |
| 6,775,823 B2 * | 8/2004 | MacDonell | ................... | 717/124 |
| 6,981,245 B1 * | 12/2005 | Schwabe | ...................... | 717/126 |
| 7,042,257 B2 * | 5/2006 | Wang | ............................. | 327/115 |
| 7,047,257 B2 * | 5/2006 | Fletcher et al. | ........................ | 1/1 |
| 7,073,170 B2 | 7/2006 | Grier et al. | | |
| 7,099,818 B1 * | 8/2006 | Nemecek et al. | ............... | 703/28 |
| 7,131,112 B1 | 10/2006 | Bartz et al. | | |
| 7,146,608 B1 | 12/2006 | Newman et al. | | |
| 7,155,462 B1 * | 12/2006 | Singh et al. | ................... | 717/170 |
| 7,158,993 B1 * | 1/2007 | Schwabe | ....................... | 717/116 |
| 7,171,618 B2 * | 1/2007 | Harrington et al. | ........... | 715/229 |
| 7,228,541 B2 * | 6/2007 | Gupton et al. | ................ | 717/175 |
| 7,260,818 B1 * | 8/2007 | Iterum et al. | ................... | 717/170 |
| 7,386,836 B2 * | 6/2008 | Fox et al. | ....................... | 717/120 |
| 7,478,385 B2 * | 1/2009 | Sierer et al. | ..................... | 717/174 |
| 7,506,336 B1 * | 3/2009 | Ninan | ............................ | 717/175 |
| 7,519,950 B2 * | 4/2009 | Curtis et al. | ................... | 717/120 |
| 7,519,951 B2 * | 4/2009 | Deedwaniya et al. | ........ | 717/122 |
| 7,703,073 B2 * | 4/2010 | Illowsky et al. | ............... | 717/121 |
| 7,721,258 B2 * | 5/2010 | Chamberlain et al. | ........ | 717/120 |
| 7,831,959 B1 * | 11/2010 | Perry et al. | .................... | 717/121 |
| 7,844,948 B2 * | 11/2010 | Fox et al. | ....................... | 717/120 |
| 7,873,958 B2 * | 1/2011 | Wiltamuth et al. | ........... | 717/170 |
| 8,136,092 B2 * | 3/2012 | Deedwaniya et al. | ........ | 717/122 |
| 8,166,003 B2 * | 4/2012 | Friesenhahn et al. | ......... | 707/695 |

(Continued)

OTHER PUBLICATIONS

Palix et al, "Tracking code patterns over multiple software versions with herodotos", ACM AOSD, pp. 169-180, 2010.*

(Continued)

*Primary Examiner* — Anil Khatri
(74) *Attorney, Agent, or Firm* — Microsoft Corporation (57) ABSTRACT

A requirement for a versioned resource is fulfilled, particularly in light of compatibility constraints of the requirement. Versions of the versioned resource are associated with compatibility information, such as a feature version and a service version, for example. In fulfilling the requirement, compatibility logic may be applied to identify versions that are compatible with the requirement, and selection logic may be applied to select a preferred version from the compatible versions.

20 Claims, 6 Drawing Sheets

U.S. PATENT DOCUMENTS

| | | |
|---|---|---|
| 2005/0055686 A1 | 3/2005 | Buban et al. |
| 2006/0174252 A1 | 8/2006 | Besbris et al. |
| 2006/0236317 A1 | 10/2006 | Wetherly et al. |

OTHER PUBLICATIONS

Kaur et al, "Version management and computation of software components in different phases of software development life cycle", ACM SIGSOFT, vol. 34, No. 4, pp. 1-9, 2009.*

Neamtiu et al, "Contextual effects for version consistent dynamic software updating and safe concurrent programming", ACM POPL, pp. 37-49, 2007.*

Junqueira et al, "A fine grained and flexible version control for software artifacts", ACM SIGDOC, pp. 185-192, 2008.*

Atkins et al, "Using version control data to evaluate the impact of software tools", ACM ICSE, pp. 324-333, 1999.*

Kagdi et al, "Combining single version and evolutionary dependencies for software change prediction", IEEE, pp. 1-4, 2007.*

Feiler Peter H.,"Configuration Management Models in Commercial Environments", pp. 1-54, Mar. 1991, Greevy, et al.,"Analyzing Feature Traces to Incorporate the Semantics of Change in Software Evolution Analysis", pp. 1-11, Published in ICSM 2005.

Kim, et al.,"SCM Domian Modeling and Repository Kit Design", pp. 1-25, Mar. 18, 2005.

* cited by examiner

SELECTION OF VERSIONED RESOURCE AMONG MULTIPLE COMPATIBLE VERSIONS

BACKGROUND

In the field of software, resources (such as algorithm libraries) are often created with an anticipation that subsequent versions will be developed and released in the future, where subsequent versions generally update or otherwise alter prior version(s) by adding features, fixing logical errors, improving performance or security, etc. Together, the versions of a versioned resource comprise a version history. It is common to associate each version of the resource with a version indicator according to a versioning schema, e.g., where the indicator denotes the position of a version in the version history, and its relationship with other versions. In one common versioning schema, the version indicator is a number, such as "1.0," where changes in, the number to the left of the decimal indicate major changes over prior versions, and where changes in the number to the right of the decimal indicate minor changes. Hence, a versioned resource that has been the subject of continued development may exist in many versions having different properties, as identified by a designated versioning schema.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A requirement for a versioned resource is fulfilled, particularly in light of compatibility constraints of the requirement. Versions of the versioned resource are associated with compatibility information, such as a feature version and a service version, for example. In fulfilling the requirement, compatibility logic may be applied to identify versions that are compatible with the requirement, and selection logic may be applied to select a preferred version from the compatible versions. A computer system that implements this concept may exhibit improved compatibility and functionality between interdependent components.

To the accomplishment of the foregoing and related ends, the following description and annexed drawings set forth certain illustrative aspects and implementations of the disclosure. These are indicative of but a few of the various ways in which one or more aspects of the disclosure may be employed. Other aspects, advantages, and novel features of the disclosure will become apparent from the following detailed description of the disclosure when considered in conjunction with the annexed drawings.

DETAILED DESCRIPTION

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art that one or more aspects of the disclosure may be practiced with a lesser degree of these specific details. In other instances, well-known structures and devices are shown in block diagram form in order to facilitate describing one or more aspects of the disclosure.

As noted hereinabove, the disclosure relates to fulfilling a requirement for a versioned resource, where versions of a versioned resource include compatibility information. Dependency requirements may specify an expected functionality, and a subset of the versions may be identified as fulfilling this expectation, thereby enhancing the compatibility between the dependent resource and the provided version of the versioned resource.

The term "compatibility" is used herein according to its ordinary meaning in the art of computing technologies. As one example, the term "compatibility" can mean that a resource exhibits some predictable aspects on which other resources that interact with it can rely. For example, an object class may be expected to implement a programmatic interface having certain method calls (which may be expected to have specific names, argument parameters, and requires/assures/checks conditions). If an implementation of this object class meets these expectations, then other resources may utilize the interface of instances of such a class, with an expectation that each instance implements the interface in a manner that exhibits certain characteristics. Hence, this class is compatible with the resources that rely on it because it complies with the expectations underlying the interaction. Alternatively, such a class may be incompatible with other resources if it does not meet the expectations on which the dependency is based, e.g., if the interface does not implement the methods that define the compatibility in a manner that meets the expectations of resources that may utilize these methods. This example is merely offered as one understanding of the term "compatibility," but those of ordinary skill in the art may have a broader or more nuanced understanding of this term and its application in the pertinent fields of science and technology.

The term "dependency requirement" is also used herein according to its ordinary meaning in the art of computing technologies. As one example, this term may indicate that one resource interacts with another resource, and requires the latter resource to satisfy some expectations that facilitate the purposes of the interaction. Hence, the former resource depends on the latter resource and requires it to meet some expectations, thereby establishing a dependency requirement of the former resource on the latter resource. Again, this example is merely offered as one understanding of the term "dependency requirement," but those of ordinary skill in the art may have a broader or more nuanced understanding of this term and its application in the pertinent fields of science and technology.

It can be appreciated that the manner in which a dependency is specified and fulfilled can lead to various advantages and disadvantages. As one example, it is possible to design a versioning schema such that each dependent resource specifies its requirement as a single version of the versioned resource, e.g., by specifying a single version indicator for the versioned resource. This schema has the advantage of uniquely identifying the version of the versioned resource with which the dependent resource is designed to interact. However, this schema fails to allow a dependent assembly to take advantage of continued development of the versioned resource.

In another versioning schema, versions of the versioned resource are associated with similar version indicators, but the dependent resources do not specify a precise version of the resource for its dependency requirement. Rather, the requirement identifies only the versioned resource, and allows the computer system to choose any version of the versioned resource in order to fulfill the dependency requirement. It may be logical to choose the highest-ordered accessible version, since this version is likely to present the latest developments among all accessible versions of the versioned resource.

However, the versioning information that is included in this type of versioning schema may create problems in fulfilling the dependency requirement. Specifically, while one version may improve on a prior version, the later version may not offer the same functionality as the earlier version. For instance, the later version may correct a security loophole in an earlier version, but may do so by restricting its functionality. As another example, the later version may be improved to remove errors, perform faster, or expose an easier interface for users and developers; but the later version may necessarily modify certain features or interfaces that the earlier version provided. Thus, this type of versioning schema may fail to identify the compatibility of each version with respect to other versions of the versioned resource.

The absence of compatibility information from this versioning schema may frustrate the fulfillment of dependency requirements. For instance, a higher version of a versioned resource may operate differently and under different conditions. A dependent resource may be designed with an expectation that the versioned resource on which it depends operates in a particular way, e.g., as the lower version operates. If a computer system attempts to fulfill the dependency requirement by providing the higher version, discrepancies may arise between the expectations of the dependent resource and the operation of the version provided. This incompatibility may create inefficiency, expose security vulnerabilities, and/or create logic flaws that cause errors to arise and/or processes to fail, for example.

Figure 1:
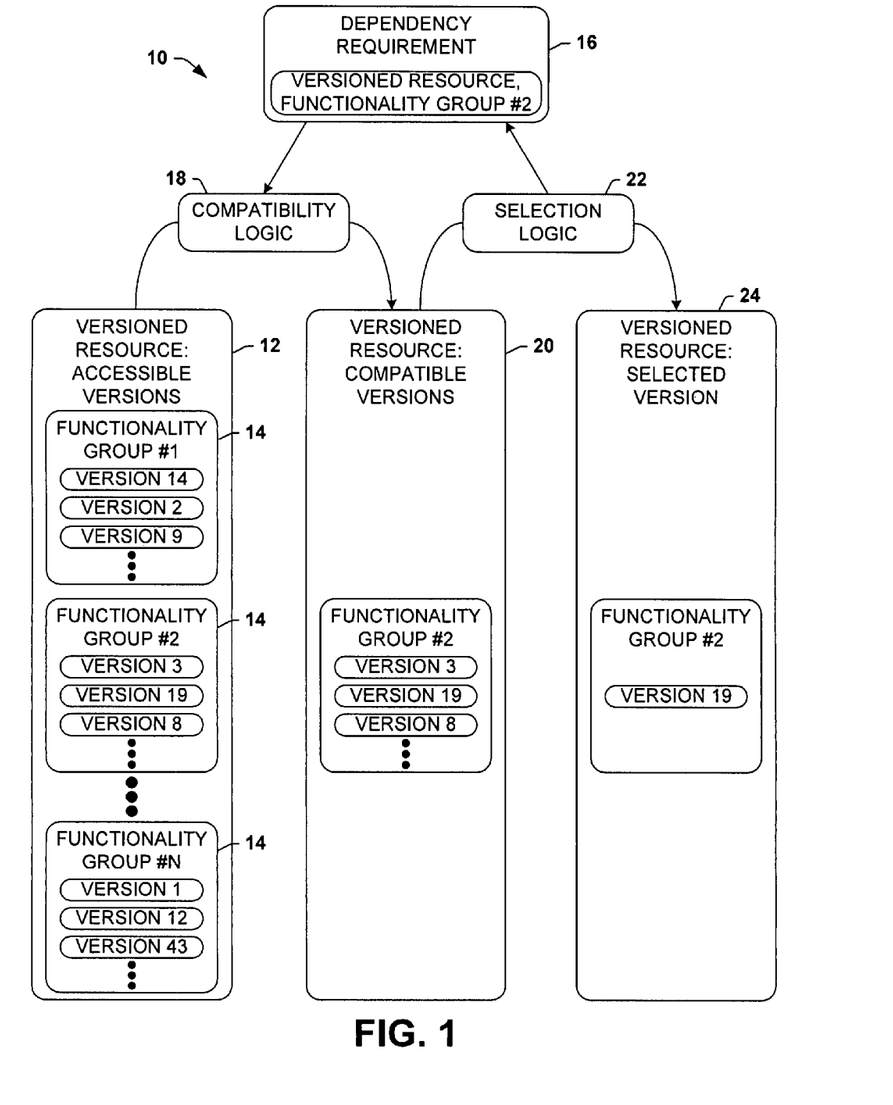
FIG. 1 is an exemplary component interaction diagram illustrating an interaction.

Turning to FIG. 1, an exemplary component interaction diagram 10 is provided to illustrate an interaction in accordance with the disclosure. This interaction generally transpires in a computer system, wherein a set 12 of accessible versions of a versioned resource is maintained. The accessible versions have been identified as belonging to N different functionality groups 14 (N being a positive integer), where the versions comprising each functionality group share a compatibility. In this interaction, a dependency requirement 16 arises, e.g., a reliance of a dependent resource (such as an executable program) on the versioned resource (such as an algorithm library.) In order to satisfy the requirement 16, the computer system endeavors to locate a version of the versioned resource that meets the compatibility expectations of the requirement 16—in this example, a version of the resource that satisfies functionality group #2. The computer system applies a compatibility logic 18 that compares the details of the dependency requirement 16 with the set 12 of accessible versions of the versioned resource and identifies the versions that satisfy the dependency requirement 16. The compatibility logic 18 thereby produces a subset 20 of versions of the versioned resource that are compatible with the functionality expected by the dependency requirement 16.

To the subset 20 of compatible versions, the computer system applies a selection logic 22 that selects a preferred version 24 of the versioned resource. This version is "preferred" according to the criteria applied by the selection logic 24 in order to select one version among a plurality of suitable versions. These criteria may involve many factors and considerations, some of which will be discussed in detail hereinbelow. Regardless of the particular selection logic applied, the preferred version 24 is used to fulfill the dependency requirement 16, e.g., by providing the preferred version of an algorithm library to an executable program.

Figure 2:
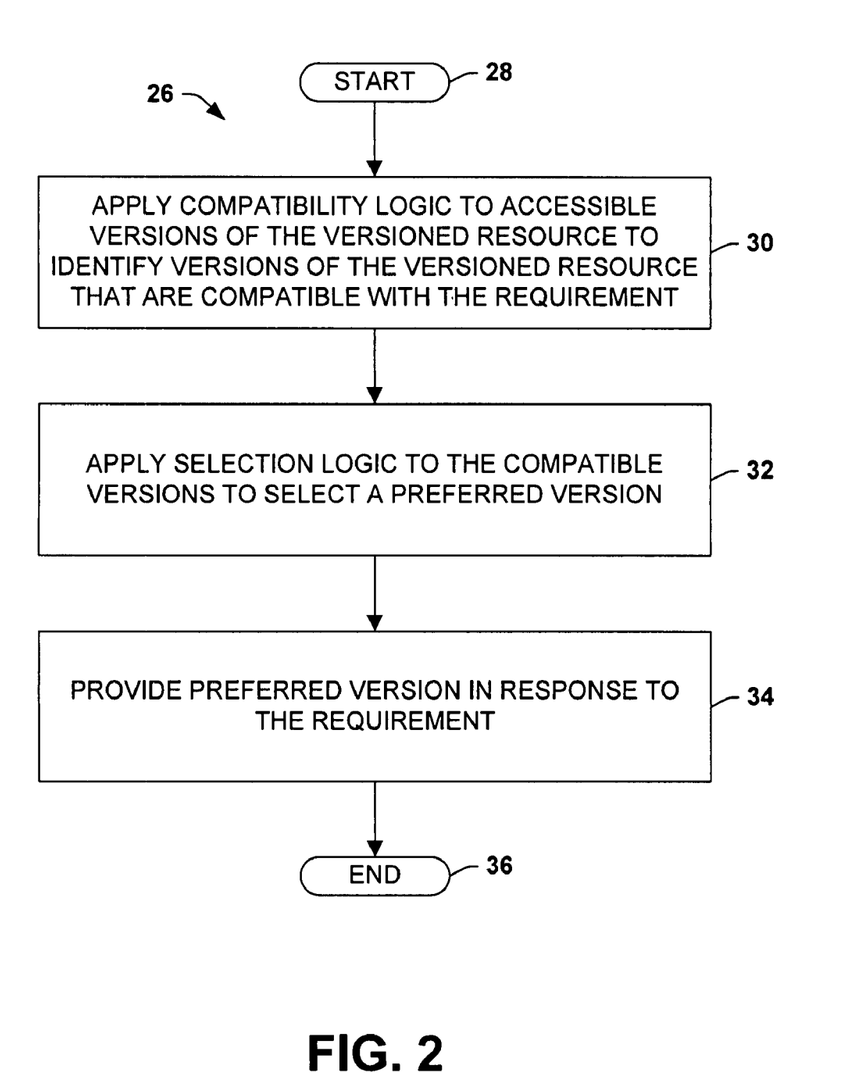
FIG. 2 is a flowchart illustrating an exemplary method.

A computer-implemented method 26 of fulfilling a requirement for a versioned resource is illustrated in FIG. 2. While the method 26 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

The method 26 begins at 28 and applies a compatibility logic to accessible versions of the versioned resource to identify versions of the versioned resource that are compatible with the requirement, as illustrated at 30. The method 26 also applies a selection logic to the compatible versions to select a preferred version, as illustrated at 32. The method 26 then provides the preferred version in response to the requirement, as illustrated at 34, at which point the method ends at 36.

It will be appreciated that the elements of this method may be performed in any order that is operable to satisfy the ends of this technique. For instance, in one embodiment, the method 26 may be configured to apply the compatibility logic 30 to all available versions in order to identify the compatible versions, and upon completion of the compatibility logic 30, may then apply the selection logic 32 to the compatible versions to select a preferred version. Thus, the method 26 applies the compatibility logic 30 in sequence with the selection logic 32 in order to identify the preferred version. In another embodiment, the method 26 may be configured to initiate the compatibility logic 30, and as the compatibility logic 30 identifies compatible versions, the method 26 may apply the selection logic 32 to the thus-far-identified versions to identify a preferred version. Thus, the method 26 may apply the compatibility logic 30 and the selection logic 32 concurrently in order to identify the preferred version. In still another embodiment, the method 26 may be configured to provide a first preferred version in response to the requirement 34 upon the selection logic 32 identifying one preferred version, but may then provide another preferred version in response to the requirement 34 if the selection logic 32 identifies a second, more highly preferred version. Thus, the method 26 may apply the selection logic 32 concurrently with providing a preferred version in response to the requirement 34. This configuration may have the advantage of fulfilling the requirement as soon as possible, while reserving the option of improving upon the response with an even more preferred compatible version that it later identifies.

In light of the method illustrated in FIG. 2, the elements of the method will now be discussed in turn. It will be appreciated that the various concepts and embodiments discussed herein may be incorporated in any desired configuration that is operative to satisfy the ends of the techniques described herein.

As illustrated in FIG. 1, compatibility information serves to form groups of versions 14 that share a compatibility, such that a requirement for a particular functionality may be satisfied with full compatibility by any of the versions within the respective functionality group. The compatibility information may be structured according to many suitable configurations. In one example, the compatibility information comprises a two-tier versioning schema. The first tier comprises the feature versions of the versioned resource, where each feature version represents a set of expectations about some aspects of the versioned resource. As discussed hereinabove, these expectations may, for example, include the operating characteristics of an interface in an object class, such as the requires/assures/checks criteria of a method exposed by the interface. Respective versions of the versioned resource 12 within a particular feature version 14 fulfill the defining specification of the feature version 14, e.g., by adequately implementing the aspects of an interface in a manner that produces expected characteristics that are emblematic of the feature version. Accordingly, versions of the versioned resource within the same feature version 14 are compatible, and any such version may be used to fulfill a requirement 16 for the versioned resource having this feature version 14. The feature versions 14 may be identified by feature version indicators, which may take many forms. As one example, the feature version indicators may comprise a number, wherein higher-numbered feature versions are of higher (but not necessarily compatible) quality than lower-numbered feature versions. As another example, the feature version indicators may comprise a letter, which may or may not include an ordering or preference between feature versions 14.

The second tier of this exemplary versioning schema comprises a set of service versions within each feature version, where the service version denotes a different development history of the version with respect to other versions within the same feature version. In one embodiment, the service versions may be identified by the date on which each version was created, where later-created service versions are presumably of higher quality than earlier-created service versions. In another embodiment, the service versions may be identified by a number, where service versions having higher service numbers may be regarded as having improved performance, fewer or more limited security vulnerabilities, and/or fewer logical errors, for example, than service versions within the same feature version, but that are identified with lower service version numbers. In this example, the respective accessible versions of the versioned resource 12 are associated with a feature version and a service version. The associations may be utilized as described herein for logically determining functional compatibilities, and for fulfilling requirements for the versioned resource based on the compatibility information associated with the accessible versions of the versioned resource.

By way of further example, the feature versions 14 may be arranged in an ordering, where higher-ordered feature versions successively build upon lower-ordered versions, such that each higher-ordered feature version implements at least the minimum feature version of a lower-ordered feature version. For example, a feature version having the number 2 may fulfill the compatibility expectations of a feature version having the lower-ordered number of 1, while also extending the functionality with additional interfaces and/or functionality. A requirement 16 for the versioned resource may indicate its compatibility needs by specifying a minimum feature version 14 of the versioned resource 12, whereby any version embodying at least the specified feature versions is compatible with the requirement. The compatibility logic identifies as compatible with the requirement the versions of the versioned resource 12 that have an association with at least the minimum feature version. The requirement 16 may also specify a minimum service version within the minimum feature version (e.g., where the dependent resource requires not only a compatibility with the feature version, but also a performance of the versioned resource that is at least as updated as that exhibited by the version having the specified minimum service version.) The compatibility logic 18 identifies as compatible with the requirement the versions of the versioned resource 12 that have an association with at least the minimum service version within the minimum feature version.

The requirement may also specifically depend on the functionality exhibited by one or more feature versions, and may be less compatible with the functionality exhibited by other feature versions. Therefore, the requirement 16 may indicate its compatibility needs by specifying one or more feature versions 14 as the only feature versions that can fulfill the requirement. Accordingly, the compatibility logic 18 may identify as compatible with the requirement the versions of the versioned resource 12 that have an association with at least one of the specified feature versions. The requirement 16 may also specify a minimum service version within at least one of the specified feature versions 14. Accordingly, the compatibility logic identifies as compatible with the requirement 16 the versions of the versioned resource 12 having an association with at least one of the specified feature versions 14, and also with at least the minimum service version within the feature version.

It will be appreciated that feature versions 14 may also be devised to represent different sets of functionality that may not be mutually exclusive. As such, it is possible that a version of the versioned resource may embody the minimally specified functionality of more than one feature version 14. Accordingly, it is possible, and may be advantageous, to provide associations between a version of a versioned resource and a plurality of feature versions. The compatibility logic 18 could be configured to perform its identification of compatible versions of the versioned resource 20 by considering respective associations between a version and a plurality of feature versions. Additional embodiments may feature other representations of the compatibility information associated with versions of versioned resources, and such embodiments may be in accordance with this disclosure.

Figures 3, 4:
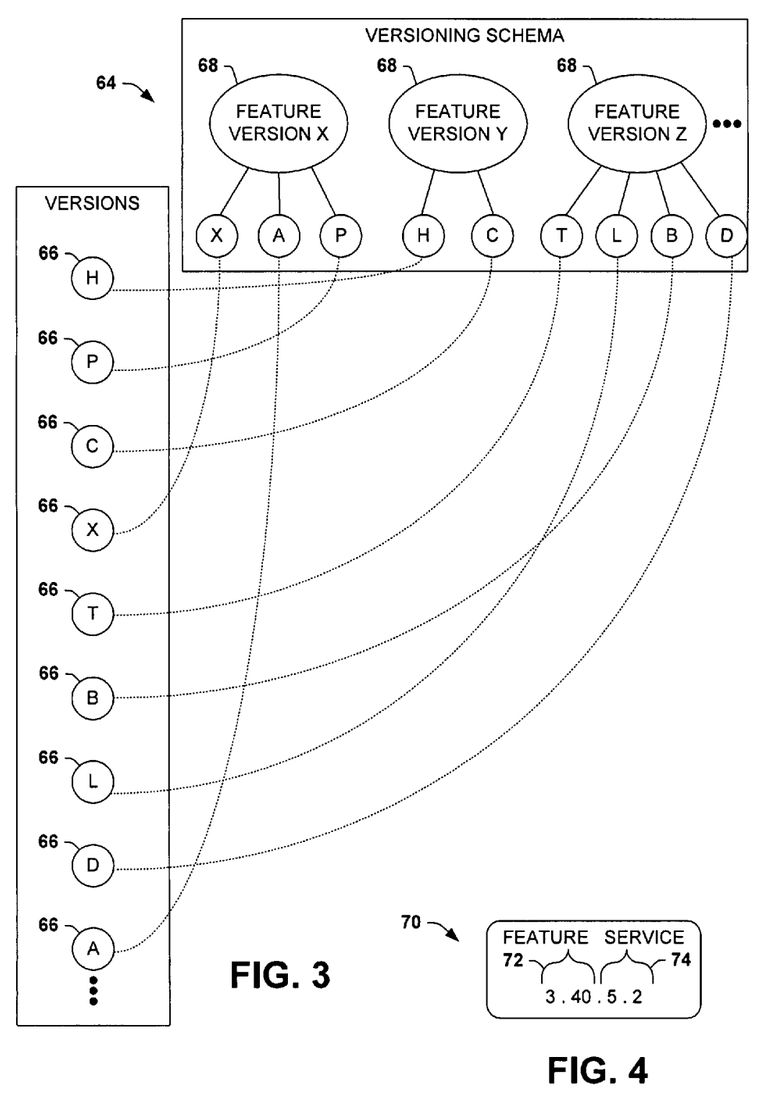
FIG. 3 is an illustration of a versioning schema that may be implemented in an exemplary method.
FIG. 4 is a versioning indicator that may be used in a versioning schema implemented in an exemplary method.

This exemplary two-tier versioning schema may be better understood with reference to FIG. 3, in which the versioning schema 64 organizes the versions of a versioned resource into feature versions (as the first tier) and service versions within respective feature versions (as the second tier.) In this illustration, the accessible versions 66 of the versioned resource are shown as a set, and it will be appreciated that such accessible versions may reside in a number of computer-accessible locations, such as (for example) a file system, a portion of system memory, and a versioned resource repository, as described herein.

The versioning schema 64 includes any number of accessible versions 66, which may be identified in any suitable manner. The exemplary versioning schema illustrated in FIG. 3 includes Feature Version X, Feature Version Y, and Feature Version Z. These feature versions 68 comprise the first tier of the two-tier versioning schema. The accessible versions 66 are each associated with a feature version 68 in order to represent the compatibility information. Moreover, the accessible versions 66 of the versioned resource are associated with identifiers that serve as the service versions of each version within each feature version 68. For example, accessible version "D" of the versioned resource is associated with feature version Z. This accessible version of the versioned resource may therefore be particularly identified in the two-tier versioning schema as Feature Version "Z", Service Version "D".

Another exemplary versioning schema is illustrated in FIG. 4 that implements the two-tier versioning schema described hereinabove in a different manner. In this implementation 70, the version of the versioned resource is assigned a four-number version indicator, which uniquely identifies the version as compared with all other versions of the versioned resource. As illustrated, the former two numbers 72 of the version indicator identify the feature version, and the latter two numbers 74 of the version indicator identify the service version. Accordingly, the version indicator shown in FIG. 4 identifies a version of a versioned resource belonging to Feature Version 3.40, and to Service Version 5.2 within Feature Version 3.40. While FIGS. 3 and 4 illustrate two alternative versioning schemas, it will be appreciated by those of ordinary skill in the art that many versioning schemas may be devised in accordance with the disclosure.

Turning now to the selection logic, and with reference again to FIG. 1, the selection of a preferred resource 24 from the subset of compatible resources 20 may be performed in many ways. If fewer than two compatible versions are identified by compatibility logic 18, the selection logic may simply return the results of the compatibility identification 20. On the other hand, if two or more compatible versions 20 are identified by the compatibility logic 18, then the selection logic 22 selects a preferred version 24 to be returned in response to the requirement 16. For example, the selection logic 22 may prefer the version 24 of the versioned resource having the highest available feature version, and optionally having the highest available service version within the specified feature version, among all of the identified compatible versions. Alternatively or additionally, the selection logic 22 may prefer the version 24 having the most recent date of creation among all of the identified compatible versions 20. As still another alternative or additional factor, the selection logic 22 may prefer the version 24 having an association with the feature version that most closely resembles a specified feature version, and optionally having an association with the service version that most closely resembles a specified service version within a specified feature version. The latter may be advantageous where the dependent resource is most desirably provided with the resource that most closely meets its functionality expectations, while also identifying versions that are adequately compatible with the requirement. It will be appreciated that other embodiments may feature a selection logic that operates on a wide variety of information in the selection of a preferred version of the versioned resource, and such embodiments may be in accordance with this disclosure.

Having described the general principles of the techniques disclosed herein, the disclosure now turns to some implementations having a variety of features and potential advantages.

As noted above, the compatibility information may be represented in many ways. As one example, such as the exemplary versioning schema illustrated in FIG. 3, the compatibility information may be represented by a two-tier hierarchical versioning schema 68 comprising feature versions and service versions. Some implementations may generate this compatibility information according to many suitable techniques. In one embodiment, an individual, e.g. a software developer, may assign compatibility information to each version, based on the individual's understanding of the logical operation of the version as compared with other versions of the versioned resource. In another embodiment, a lexical analyzer may be applied to the source code for the version in order to compare the functionality of the version with other versions, and may automatically generate compatibility information based on the results of this analysis. In still another embodiment, a testing algorithm may be applied to the versioned resource to explore the functionality of the version; e.g., by testing an algorithm in an algorithm library with various sets of parameters and examining the performance and output of the algorithm. The testing algorithm may then assign compatibility information to the versioned resource that places it in the same group as other versions exhibiting similar performance. Additional embodiments may feature other techniques for generating compatibility information, and such embodiments may be in accordance with this disclosure.

The compatibility information may also be stored according to many suitable configurations. In one embodiment, the compatibility information may be built into the module for the version of the versioned resource; e.g., the version may be compiled into an assembly having a manifest that specifies its compatibility information. Also, the compatibility information may be placed in a configuration file that is stored separately from the version; e.g., a separate configuration file may include the compatibility information for one or more versions of a versioned assembly. This particular embodiment may be implemented as an XML-structured assembly configuration file that documents the compatibility information for one or more versions of the versioned resource. In still another embodiment, the compatibility information may be retained and managed by a centralized service or process, such as a centralized assembly cache that provides versioned resource services for the computer system. Additional embodiments may feature other techniques for storing compatibility information for each version of the versioned resource, and such various information storage techniques may be in accordance with this disclosure.

As noted herein, the disclosure relates to a requirement of a dependent resource on the versioned resource, and the manner in which the requirement is specified may comprise many suitable configurations. For example, compatibilities may be indicated through feature versions and service versions, where the requirement may specify a minimum feature version, and optionally a minimum service version within the feature version. Alternatively, the requirement may specify at least one specific feature version, and optionally a minimum service version within one or more of the specified feature versions.

Another aspect of the requirement having various embodiments within the disclosure pertains to the initiation of the requirement fulfillment process. In one embodiment, the dependent resource may initiate a request to have the dependency fulfilled, such as through a computer system interface or method invocation that initiates the versioned resource selection process. In another embodiment, the dependent resource simply includes a documented association with the versioned resource, and the computer system initiates the requirement fulfillment process in order to utilize the dependent resource. In still another embodiment, the dependent resource may in turn service another resource that depends on it, and the former dependency has to be satisfied in order to complete the latter dependency. Additional embodiments may designate other events that trigger the requirement fulfillment process, and such additional embodiments may be in accordance with this disclosure.

The compatibility logic may also be implemented in a range of embodiments featuring various advantages. The foregoing discussion suggests several methods of representing the compatibility information of each version of the versioned resource. In addition, the physical and logical location of each version may vary in several aspects, which will be discussed with exemplary reference to FIG. 1. In one embodiment, the accessible versions 12 are stored in a file store, which may be recorded on a persistent storage medium like a hard disk drive or an optical disc. For instance, one or more versions of the versioned resource 12 may be located in a folder designated for an executable program that depends on the versioned resource. Alternatively or additionally, one or more versions of the versioned resource 12 may be located in a folder shared by a suite of applications, such as a set of productivity programs; this embodiment may permit each application in the suite to rely upon the same versions of a resource, thereby presenting consistent functionality or behavior across all of the programs in the suite. Alternatively or additionally, one or more versions of the versioned resource 12 may be located in a system-wide folder, such as a common folder hosted by the operating system of the computer. Moreover, the versions may be distributed in a plurality of such logical locations in the file system, and the compatibility logic 18 may be configured to search for versions of a versioned resource 12 in a series of such locations.

In another embodiment, the computer system stores one or more versions of a versioned resource in a system memory, such as system RAM or a swap file on a hard disk drive. This embodiment is desirable in the case of frequently used versioned resources, such as hardware drivers or low-level system resources on which many or all processes rely. As one example, illustrated with reference to FIG. 1, the versions 12 may be loaded into volatile memory during the computer system boot process and retained to provide fast fulfillment of such common dependencies. Alternatively or additionally, the versions 12 may be loaded into a volatile memory cache upon first use, in anticipation of frequently following dependency requirements upon the versions. As yet another alternative or additional variation, the computer system may load the versions 12 into a volatile memory cache upon the user's manual activation of the resource, e.g., by starting a service that relies upon the versioned resource 12.

In still another embodiment, the computer system stores one or more versions of a versioned resource 12 in a versioned resource repository, which serves as a specialized service for retaining, managing, and relating many versions of many versioned resources. For instance, the versioned resource repository may comprise a relational database, which may store the compatibility information for each version 12 as relational metadata, which is separate from but associated with the binary data comprising each version 12. This embodiment may have the advantage of providing a centralized, standardized method of storing and accessing versioned resources, thereby easing the search process of the compatibility logic. This embodiment may also have the advantage of avoiding a need for each dependency requirement to identify the location of the versions of the versioned resource 12 (e.g., the logical position in a local file system where the versions might be stored.)

In a final embodiment, the computer system may store various versions of the various versioned resources 12 in several such locations as identified above. Accordingly, the compatibility logic 18 may be configured to search for versions of the versioned resource 12 in many locations, and may also search such locations in a particular order. For instance, in fulfilling a particular dependency requirement 16, the compatibility logic 18 may begin the search for compatible versions 12 in a centralized assembly cache; it may then proceed to search in a system memory, such as a volatile memory cache; and it may then search in one or more logical locations in the file store. Additional embodiments may feature other techniques for storing and servicing versions of versioned resources 12, and such embodiments may be in accordance with this disclosure.

Similarly, the selection logic 22 may be implemented in several embodiments, each having various advantageous aspects. In one aspect discussed hereinabove, the selection logic 22 may be invoked once the compatibility logic 18 has completed its evaluation of the accessible versions. Alternatively, the selection logic 22 may run concurrently with the compatibility logic 18, and may select a preferred version 24 from the compatible versions 20 identified thus far, while the compatibility logic 18 continues to locate additional compatible versions 20.

In another aspect discussed hereinabove, the selection logic 22 selects the preferred version 24 of the versioned resource 12 based on the compatibility information associated with the respective compatible versions 20. In one embodiment, from all compatible versions 20, the selection logic selects the version 24 associated with the highest feature version and the highest service version within the highest feature version. In another embodiment, from all compatible versions 20, the selection logic 22 selects the preferred version 24 having the feature version and service version that are closest to the feature version and service version specified in the requirement. In yet another embodiment, from all compatible versions 20, the selection logic 22 selects the version having the most recent creation date.

In addition to the compatibility information, the selection logic 22 may also take into account other aspects of the compatible versions 20 when selecting a preferred version 24. In one embodiment, the selection logic 22 takes into account the locations of each compatible version 20 in selecting a preferred version 24. For example, the selection logic 22 may preferentially select a version 24 of the versioned resource 12 that is stored in a versioned resource repository over a version 12 stored in a logical location in a file store, as the former may be regarded as more reliable and of potentially higher quality. In another embodiment, the selection logic 22 may apply code access security policies and principles in selecting a preferred version 24. For instance, a version 12 hosted on a local server within a network domain may be preferred over versions 12 installed locally, or versions 12 hosted on a less trusted server on the internet. In still another embodiment, the selection logic 22 may take into account the cryptographic signature status of each compatible version 20 in selecting a preferred version 24. For instance, compatible versions 20 that are associated with a valid digital trust certificate, such as a VeriSign certificate, may be preferred over versions 20 having no such association. Additional embodiments may feature other techniques for selecting a preferred version 24 of the versioned resource 12, and such embodiments may be in accordance with this disclosure.

The version 24 selected by the selection logic 22 may in turn depend on another versioned resource 12. The selection logic 22 may attempt to resolve the dependency requirement of this selected version before designating it as the preferred version 24. If the selected version is found to have a dependency requirement that cannot be satisfied, the selection logic 22 may select another compatible version 20 of the versioned resource as the preferred version 24, pending the resolution of its dependency requirements.

When the selection logic 22 has identified a preferred version 24, the method provides the preferred version 24 in response to the requirement 16, and this provisioning may be implemented with various aspects. As one aspect, the computer system may grant access by the dependent resource to the preferred version 24. Such access may be granted with various attributes, such as exclusive access or access shared with other dependent versions; with read-only or with read/write access to the preferred version; for an indefinite time and degree of use, such as the life of the dependent resource, or only for a limited time or degree of use; and with various sets of security permissions or trust levels. As another alternative, the computer system may make a copy of the preferred version 24 and provide it to the dependent version. As another aspect of the provisioning, the computer system may extend the provisioning only to the dependent resource, or to a set of resources that together comprise an application. For example, the dependent resource may comprise a thread or process among other threads or processes that cooperate to accomplish a shared task or to operate as a single application. Additional embodiments may feature other aspects for the provisioning of the preferred version of the versioned resource to the dependent resource, and such embodiments may be in accordance with this disclosure.

The scenario may arise where the compatibility logic 18 and/or selection logic 22 fails to identify any accessible version of the versioned resource 12 that is compatible with the dependency requirement 16. In this case, the method may respond to the requirement with an unavailable version message. As one alternative, the method may return a "null" reference in response to the dependency requirement 16, with an expectation that the dependent resource will gracefully handle this response. As another alternative, the method may raise an exception to be handled by the dependent resource. As still another alternative, the computer system may receive the unavailable version message (e.g., in the event that the exception is raised but unchecked by the dependent assembly), and may respond accordingly, such as by placing the dependent assembly in a wait state until a compatible version is available, or by abandoning or terminating the dependent resource. Additional embodiments may feature other techniques for handling a failed dependency requirement, and such embodiments may be in accordance with this disclosure.

Figure 5:
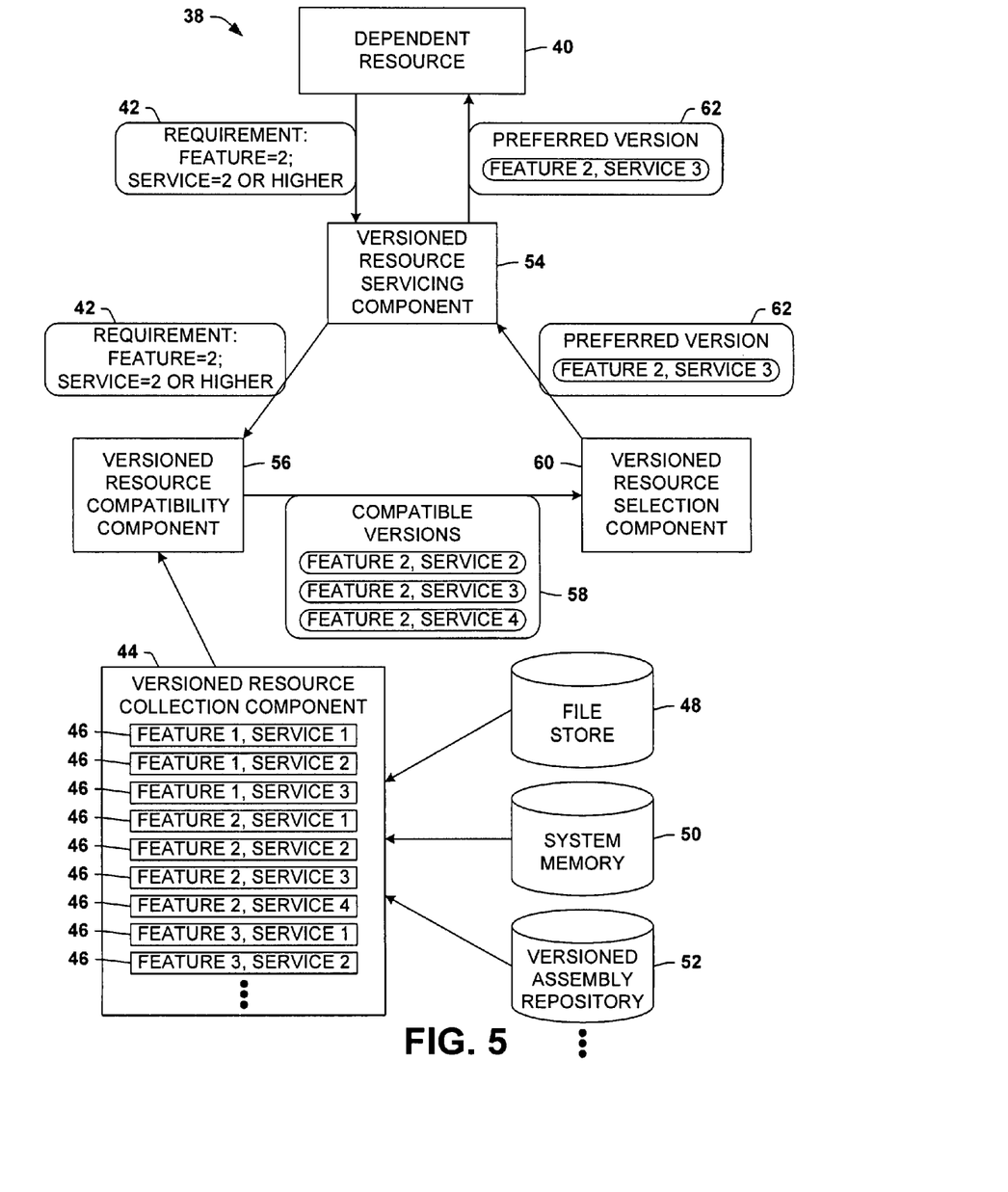
FIG. 5 is a component diagram illustrating an exemplary system.

It will now be appreciated that the concepts described herein may be embodied in many forms, e.g., as a system for fulfilling a requirement for a versioned resource. One such system is illustrated in FIG. 5, along with a typical scenario in which the system fulfills a dependency requirement for a dependent resource. In this system 38, the dependent resource 40 specifies its dependency requirement according to the compatibility-based versioning schema; in the example illustrated in FIG. 5, the dependency requirement 42 specifies feature version #2, and service version #2 or higher within feature version #2.

The system 38 also includes a versioned resource collection component 44 configured to contain versions 46 of the versioned resource. As indicated in FIG. 5, the versioned resource collection may contain any number of versions 46 of the versioned resource. As noted hereinabove, the versions 46 of the versioned resource that are contained in the versioned resource collection component 44 may reside in any of several locations that are accessible to the computer system, such as a file store 48, a system memory 50, and/or a versioned assembly repository 52. As indicated in FIG. 5, the versions may also reside in other locations, and those of ordinary skill in the art may be able to identify many storage mechanisms that are suitable for this purpose. In the embodiment illustrated in FIG. 5, the compatibility information for the respective versions 46 contained in the versioned resource collection component 44 is represented by an association between the version 46 and a feature version and a service version.

The system 38 includes a versioned resource servicing component 54 that acts on the dependency requirement. The versioned resource servicing component 54 provides the requirement to a versioned resource compatibility component 56, which is configured to identify versions of the versioned resource 46 in the versioned resource collection component 44 that are compatible with the requirement 42. The versioned resource compatibility component may satisfy this function by implementing a compatibility logic, such as described hereinabove. The result of the versioned resource compatibility component 56 is a set of versions 58 of the versioned resource that are compatible with the requirement 42. In the example illustrated in FIG. 5, the versioned resource compatibility component 56 has identified as compatible with the requirement 42 three versions 58 of the versioned resource from among the accessible versions 46, where all three versions 58 have feature version #2, and at least service level #2 within the specified feature version #2.

The system 38 also includes a versioned resource selection component 60, which is configured to select a preferred version 62 from the compatible versions 58 of the versioned resource that were identified by the versioned resource compatibility component 56. The versioned resource selection component 60 may satisfy this function by implementing a selection logic, such as described hereinabove. In the example illustrated in FIG. 5, the versioned resource selection component 60 has selected as the preferred version 62 the version having feature version #2 and service version #3, from among the compatible versions 58 identified by the versioned resource compatibility component 56.

When the versioned resource selection component 60 has identified a preferred version 62 of the versioned resource, the versioned resource servicing component 54 provides the preferred version 62 to the dependent resource 40. This provisioning fulfills the dependency requirement of the dependent resource 40 and completes the operation of the system 38.

The system illustrated in FIG. 5 may be implemented in many embodiments having a variety of features and potential advantages. In one example, including the system embodiment illustrated in FIG. 5, the respective accessible versions 46 of the versioned resource in the versioned resource collection 44 may have an association with a feature version and a service version. The dependency requirement 42 may specify a minimum feature version and a minimum service version within the minimum feature version, and the versioned resource compatibility component 56 identifies as compatible with the dependency requirement 42 only the versions having an association with at least the minimum service version within the minimum feature version. The dependency requirement 42 may specify at least one specific feature version and a minimum service version within at least one of the specified feature versions, and the versioned resource compatibility component 56 identifies as compatible with the dependency requirement only the versions having an association with at least the minimum service version within at least one of the specified feature versions. The versioned resource selection component 60 may select the preferred version 62 from the identified compatible versions 58 according to the highest feature version, and the highest service version within the highest feature version. Finally, the system 38 may be embodied as a computer-readable medium comprising processor-executable instructions configured to implement the system.

Figure 6:
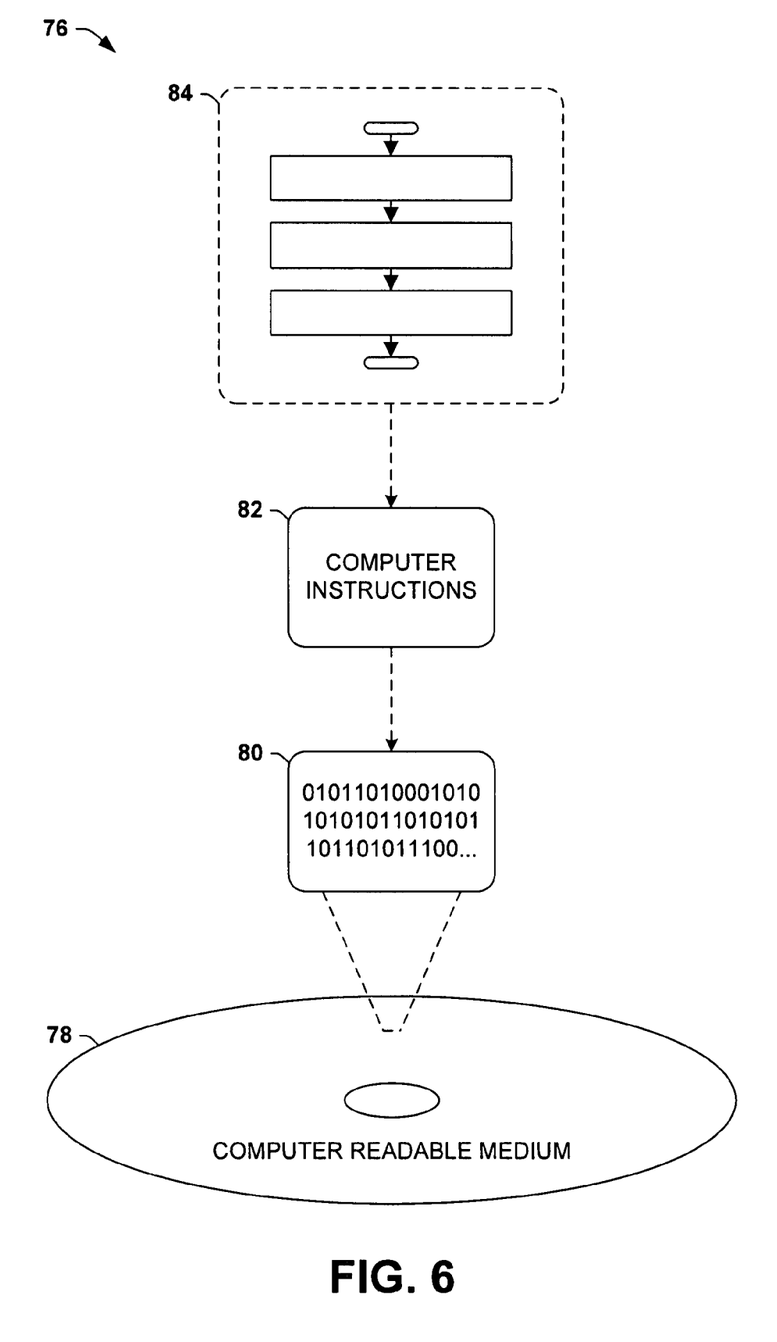
FIG. 6 is an illustration of an exemplary computer-readable medium comprising processor-executable instructions configured to perform a method such as disclosed herein.

As another exemplary form of embodiment in accordance with this disclosure, the method may be embodied as a computer-readable medium comprising processor-executable instructions configured to perform the method described herein. In one such embodiment, the computer-readable medium may contain a runtime algorithm for launching software processes, which functions by loading the code for the process, performing any necessary additional compilation (e.g., in the case of partially compiled code), and binding the compiled code with all of its required dependencies. The method presented herein may be integrated with the binding component of this runtime algorithm in order to fulfill the runtime binding requirements of the application according to the compatibilities of the accessible versions of the versioned resource. One example of this form of embodiment is illustrated in FIG. 6, wherein the implementation 76 comprises a computer-readable medium 78 (e.g., a CD-R, DVD-R, or a platter of a hard disk drive), on which is encoded computer-readable data 80. This computer-readable data 80 in turn comprises a set of computer instructions 82 that operate in accordance with this disclosure. For example, and as illustrated in FIG. 6, the computer instructions 82 may implement a method 84 in accordance with this disclosure, such as the method illustrated in FIG. 2, for example. Alternatively or additionally, the computer instructions 82 may implement a computer system configured to operate in accordance with this disclosure.

As a specific application of this disclosure, the method described above and illustrated in FIG. 2 may be implemented for performing a runtime binding of a dependent assembly for a versioned resource. It will be appreciated by those of ordinary skill in the art of software engineering that a software application may be built by a code compiler as one or more assemblies, where one or more of the assemblies is dependent on a versioned resource. The versioned resource may comprise, e.g., an algorithm library, and may be a modular component of the same solution that is compiled along with the dependent assembly, or may be a component from another solution that is compiled separately from the dependent assembly. The dependent assembly may be a user-executable application, and/or a versioned resource upon which other assemblies may depend in turn. These dependencies may comprise runtime bindings, such that when the computer system executes an application that includes the dependent assembly, the system endeavors to fulfill the binding requirement of the dependent assembly on the versioned resource. This "late binding" configuration presents the advantage of permitting the dependent assembly to incorporate the most preferred (e.g., an updated) version of the versioned resource that is accessible by the computer system at runtime, without requiring the dependent assembly to be recompiled to incorporate a later-created version of the versioned resource.

Figure 7:
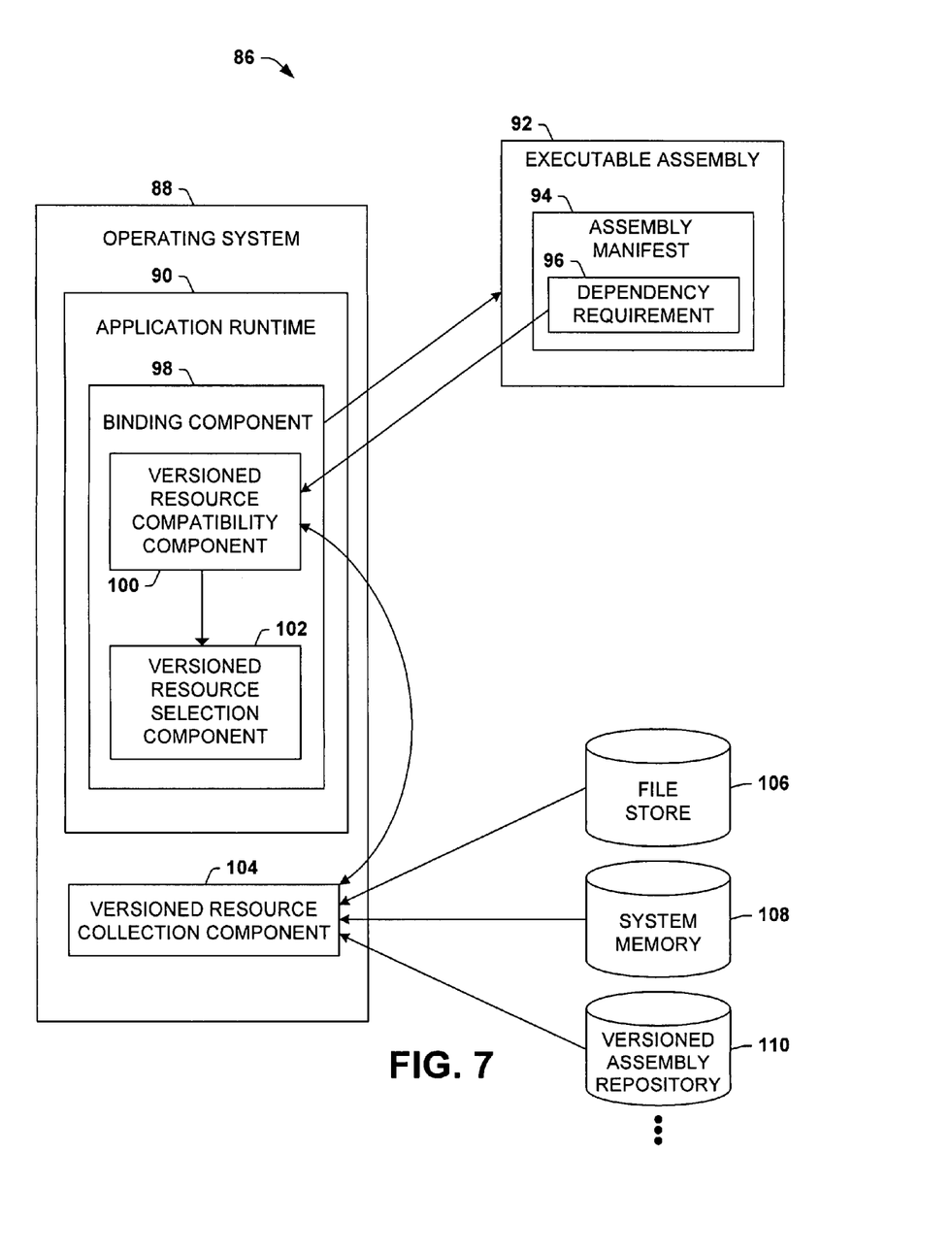
FIG. 7 is a component diagram illustrating another exemplary system.

It will be appreciated that the method may be applied within this context of runtime binding. An exemplary computer environment featuring a system for performing such runtime binding is illustrated in FIG. 7. The environment 86 illustrated therein features an operating system 88, which is configured to launch and manage processes for various software applications. The exemplary environment shown in this figure accomplishes this capability through an application runtime 90, which is configured to initiate such a process by loading and instantiating the components of the software application and providing the required resources. These resources may include an executable assembly 92, which may include an assembly manifest 94 that generally describes the contents of the assembly and its properties. In this case, the assembly manifest 94 identifies the application as having a dependency requirement 96 specifying a particular versioned resource.

The application runtime 90 acts on this information by invoking a binding component 98, which is configured to satisfy such dependency requirements in order to facilitate the operation of the process. In this exemplary system, the binding component 98 serves as the versioned resource servicing component of the system described hereinabove. In order to perform this function, the binding component 98 of this exemplary system includes a versioned resource compatibility component 100 and a versioned resource selection component 102. The binding component 98 provides the dependency requirement information to the versioned resource compatibility component 100, which is configured to apply a compatibility logic to accessible versions of the versioned resource to identify versions that are compatible with the runtime binding requirement. The versioned resource compatibility component 100 interacts with a versioned resource collection component 104 within the operating system 88 to identify the accessible resources and the compatibility information. The versioned resource collection component 104 in turn examines one or more locations where versions of the versioned resource may be stored, e.g., a file system 106, a portion of system memory 108, and a versioned resource repository 110. The versioned resource compatibility component 100 compares the versions of the versioned resource identified by the versioned resource collection component 104 with the dependency requirement 96 of the executable assembly 92, and thereby identifies compatible versions of the versioned assembly.

Once the compatible versions have been identified, the binding component 98 utilizes the versioned resource selection component 102 to select a preferred version of the versioned resource from the compatible versions of the versioned assembly. The binding component 98 then binds the preferred version to the executable assembly 92, e.g., by granting access by the executable assembly 92 to the preferred version of the versioned resource. In this manner, the operating system 88 implements a binding component 98 within an application runtime 90 that fulfills the dependency requirement 96 of the executable assembly 92.

The method is implemented to fulfill the runtime binding requirement of a dependent assembly for a versioned resource by applying a compatibility logic to the accessible versions of the versioned resource that are compatible with the runtime binding requirement. When an assembly is loaded, its dependencies are examined by the binding component of the runtime. For each dependency requirement, the binding component applies a compatibility logic to the accessible versions of the versioned resource to identify versions that are compatible with the runtime binding requirement. The binding component relies on compatibility information associated with the accessible versions, e.g., where the respective accessible versions have an association with a feature version and a service version. The binding component also relies on the runtime binding requirement to specify the dependency according to the compatibility-based versioning schema used for the versioned resource; for instance, the requirement may specify a feature version (either as a minimum feature version or a specific feature version), and a minimum service version within the feature version for the versioned resource. The binding component applies a compatibility logic to the accessible versions of the versioned resource in order to identify versions that are compatible with the runtime binding requirement. For the versions identified as compatible with the runtime binding requirement, the binding component applies a selection logic in order to select a preferred version. The binding component fulfills the runtime binding requirement of the dependent assembly by binding it with the preferred version of the versioned resource.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, "exemplary" as utilized herein merely means an example, rather than the best.

What is claimed is:

1. A method of fulfilling a requirement specifying at least one feature version of a versioned resource accessible to a computer having a processor, comprising:
   executing on the processor instructions configured to:
   apply a compatibility logic to accessible versions of the versioned resource to identify at least two compatible versions of the versioned resource that fulfill the feature version of the requirement;
   apply a selection logic to the at least two compatible versions to select a preferred version; and
   provide only the preferred version of the versioned resource in response to the requirement.

2. The method of claim 1:
   the versioned resource presenting functionality that is invokable by the computer;
   the respective accessible versions of the versioned resource identified by a feature version identifying at least one feature of the version of the versioned resource, and a service version identifying at least one service of the respective features of the versioned resource presenting the functionality; and
   the requirement issued to invoke the functionality of the versioned resource.

3. The method of claim 2, the requirement specifying a minimum feature version, and the compatibility logic identifying as compatible with the requirement the versions having an association with at least the minimum feature version.

4. The method of claim 3, the requirement specifying a minimum service version within the minimum feature version, and the compatibility logic identifying as compatible with the requirement the versions having an association with at least the minimum service version within the minimum feature version.

5. The method of claim 2, the requirement specifying at least one feature version, and the compatibility logic identifying as compatible with the requirement the versions having an association with at least one specified feature version.

6. The method of claim 5, the requirement specifying at least one minimum service version within one of the specified feature versions, and the compatibility logic identifying as compatible with the requirement the versions having an association with at least the minimum service version within at least one specified feature version.

7. The method of claim 2, the selection logic selecting the preferred version from the identified versions according to the highest feature version and the highest service version within the highest feature version.

8. The method of claim 1, at least one of the accessible versions of the versioned resource stored in a file store.

9. The method of claim 1, at least one of the accessible versions of the versioned resource stored in a system memory.

10. The method of claim 1, at least one of the accessible versions of the versioned resource stored in a versioned resource repository.

11. The method of claim 1, the preferred version generated before a later compatible version of the resource.

12. A system for fulfilling a requirement specifying at least one feature version a versioned resource on a computer having a processor and a memory, comprising:
    a versioned resource collection component comprising a set of versions of the versioned resource stored in the memory of the computer;
    a versioned resource compatibility component comprising instructions stored in the memory that, when executed by the processor, cause the processor to identify at least two compatible versions of the versioned resource in the versioned resource collection component that with fulfill the feature version of the requirement;
    a versioned resource selection component comprising instructions stored in the memory that, when executed by the processor, cause the processor to select a preferred version from the at least two compatible versions of the versioned resource; and
    a versioned resource servicing component comprising instructions stored in the memory that, when executed by the processor cause the processor to fulfill the requirement by providing the requirement to the versioned resource compatibility component and providing only the preferred version of the versioned resource in response to the requirement.

13. The system of claim 12:
    the versioned resource presenting functionality that is invokable by the computer;
    the respective accessible versions of the versioned resource in the versioned resource collection identified by a feature version identifying at least one feature of the version of the versioned resource, and a service version identifying at least one service of the respective features of the versioned resource presenting the functionality; and
    the requirement issued to invoke the functionality of the versioned resource.

14. The system of claim 13, the requirement specifying a minimum feature version and a minimum service version within the minimum feature version, and the versioned resource compatibility component identifying as compatible with the requirement the versions having an association with at least the minimum service version within the minimum feature version.

15. The system of claim 13, the requirement specifying at least one feature version and a minimum service version within at least one of the specified feature versions, and the versioned resource compatibility component identifying as compatible with the requirement the versions having an association with at least the minimum service version within at least one of the specified feature versions.

16. The system of claim 13, the selection logic selecting the preferred version from the identified versions according to the highest feature version, and the highest service version within the highest feature version.

17. The system of claim 12, the versioned resource collection comprising at least one of a file store, a system memory, and a versioned resource repository.

18. The system of claim 12, the preferred version generated before a later compatible version of the resource.

19. A method of fulfilling a runtime binding requirement of a dependent assembly for a versioned resource accessible to a computer having a processor, comprising:

executing on the processor instructions configured to:
apply a compatibility logic to accessible versions of the versioned resource to identify at least two compatible versions that are compatible with the runtime binding requirement, respective accessible versions of the versioned resource identified by a feature version identifying at least one feature of the version of the versioned resource, and a service version identifying at least one service of the respective features of the versioned resource that is invokable by the computer, and the runtime binding requirement specifying a feature version and a service version;
apply a selection logic to the at least two compatible versions of the versioned assembly to select a preferred version; and
bind only the preferred version of the versioned resource to the dependent assembly.

20. The method of claim 19, the preferred version generated before a later compatible version of the resource.

* * * * *